Jan. 24, 1961    H. H. LOGAN    2,969,130
LATHE CONTROL
Filed Sept. 26, 1957    2 Sheets-Sheet 1
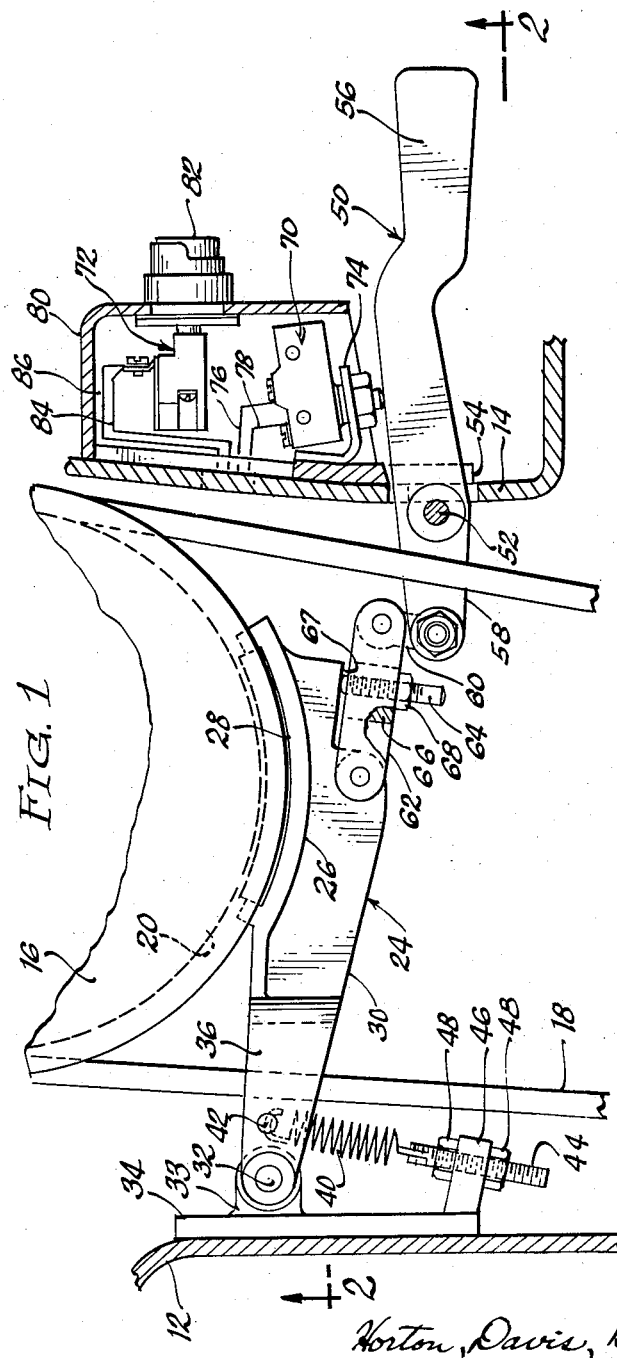
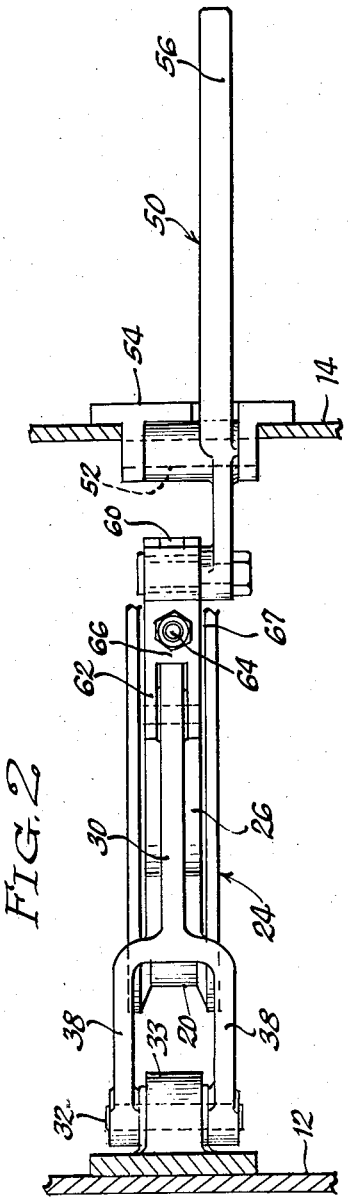
INVENTOR.
Henry H. Logan
BY
Horton, Davis, Brewer and Brugman
Attorneys Jan. 24, 1961 H. H. LOGAN 2,969,130
LATHE CONTROL
Filed Sept. 26, 1957 2 Sheets-Sheet 2
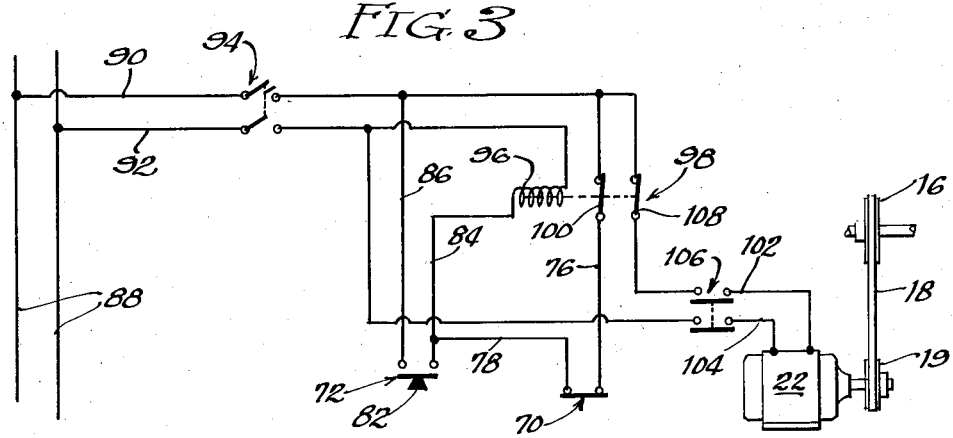
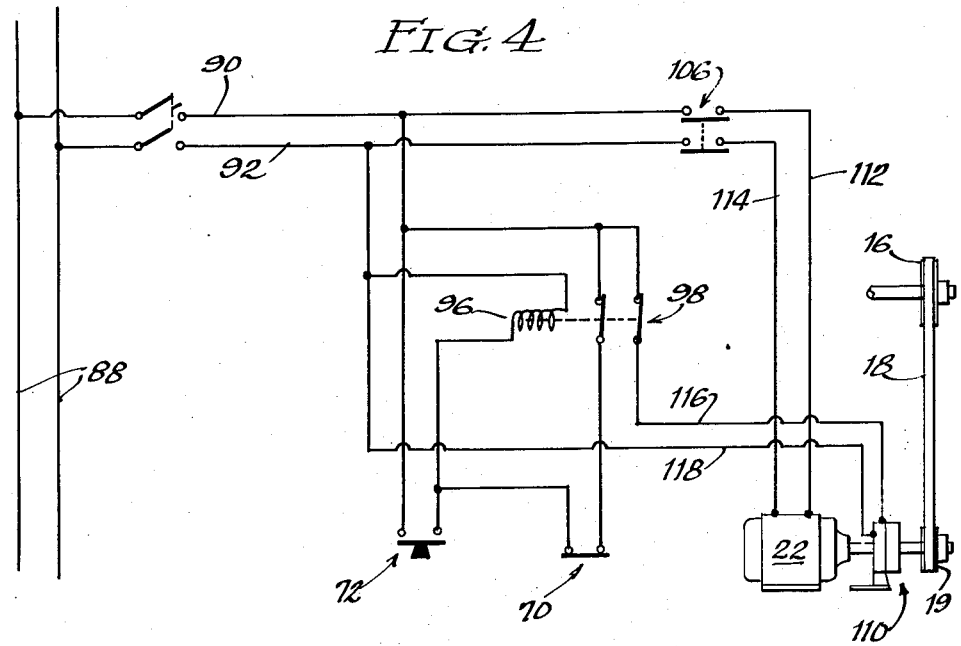
INVENTOR.
Henry H. Logan
BY
Horton, Davis, Brewer and Brugman
Attorneys United States Patent Office 2,969,130
Patented Jan. 24, 1961

2,969,130

LATHE CONTROL

Henry H. Logan, Chicago, Ill., assignor to Logan Engineering Co., Chicago, Ill., a corporation of Illinois Filed Sept. 26, 1957, Ser. No. 686,423

3 Claims. (Cl. 192—.02)

This invention relates to control apparatus for lathes and like machines.

The invention relates more particularly to means for quickly and effectively shutting off and stopping a lathe, or similar machine, when desired as, for example, when danger of personal injury is present, or when there is danger of damaging a work piece.

It has been found difficult in many instances to bring a lathe, or similar machine, to a quick and effective stop. For example, in an instance in which a single phase A.C. reversible motor is used for driving a lathe and an attempt is made to stop the lathe by reversing the motor, this cannot be done until the speed of the lathe and motor drops to quite a low value, such, for example, as a quarter of the full speed of the motor, because if the attempt is made to reverse the motor at a higher speed by reversing a switch for that purpose, the motor will continue operating at full speed in the original direction. Hence, if the operator should wait for the lathe to slow down to the speed indicated, the time required for stopping the lathe would be objectionably long.

It is an object, therefore, of this invention to provide means for bringing a lathe or similar machine to a quick and effective stop, and more particularly, to do so through the medium of manually applied pressure. For example, if a person should become caught in a lathe, whether the operator or someone else, or if a work piece is being damaged or is about to be damaged, the operator, upon becoming aware of such circumstance, may by a manual manipulation, press downwardly on a lever and bring the machine to a stop within a period of time correlated to the apparent danger involved, i.e., if the danger is great, the operator instinctively applies more pressure, and brings the lathe to a quicker stop. Therefore, another and more specific object of the invention is to provide means for bringing a lathe to a stop, in the manner referred to generally above, and arranged so that a person's natural impulse or reflex acts to establish pressure to effect the stoppage in accordance with the apparent danger involved.

Another object is to provide means of the character referred to above which is quick-acting, and especially effective in the case of an emergency, when it is desired to stop the lathe as rapidly as possible.

As another object, it is within the purview of the invention to provide control apparatus of the character indicated above that may be effectively operated by one hand.

My invention has for another object to provide control apparatus having a manually actuated means which, in its normal actuation by an operator, shuts off switch means in the circuit of the driving motor and in a single continuing movement, applies a brake to a rotatable member such as the driving pulley.

It is another object of the invention to provide control apparatus of the character indicated, incorporated in an arrangement which also includes an electrical circuit for the driving motor and in which, after actuation of the apparatus and the consequent shutting off of the switch means in the circuit, the switch means must be manually re-set so that the lathe will not rotate after having been stopped, or even partially stopped, by the control apparatus, unless manually re-set by the operator. This arrangement therefore eliminates any danger such as may otherwise be caused by continued rotation of the rotatable member after the control apparatus has been actuated, either by reason of the control apparatus having been momentarily released by the operator before the lathe has been brought to a full stop, or by such action as operation of a reversing switch with continued rotation of the driving motor in the same direction, as referred to herein.

Another object is to provide control apparatus of the general character described and which is especially adapted to use with small lathes.

Other objects and advantages of the invention will appear from the following detailed description taken in conjunction with the accompanying drawings in which:

Figure 1 is a transverse view of a portion of a lathe to which the control apparatus of this invention is applied and, for the most part, shows the control apparatus in side elevation;

Fig. 2 is a bottom view of the mechanical portion of the control apparatus, taken approximately as indicated by a line 2—2 and accompanying arrows in Fig. 1;

Fig. 3 is a circuit diagram of electrical connections utilized in one form of drive commonly used for lathes; and Fig. 4 is a diagram of a circuit commonly used in connection with another form of drive for lathes.

Referring in detail to the drawings, attention is first directed to Figs. 1 and 2 which show the control apparatus of this invention, and particularly to Fig. 1, which also shows certain elements of a lathe of a type adapted to use with the control apparatus. The lathe, as indicated by the elements referred to, may be any standard or conventional kind of lathe, and includes a rear guard 12 and a front guard 14, the latter of which is at the front of the lathe and faces an operator's station at which an operator is normally positioned for operating the machine. The lathe includes a driving pulley 16 which is secured to other rotatable parts thereof, not shown herein, such as the chuck for holding one end of the work piece. The driving pulley 16 is preferably one adapted to use with a V-belt which is shown at 18, and is provided with a groove 20 for receiving the belt. The belt 18 is trained over the driving pulley 16 and a suitable pulley 19 on the driving shaft of a motor 22 (Figs. 3 and 4) utilized for driving the lathe.

Brake means is indicated in its entirety at 24. This brake means includes a brake shoe 26 having a liner 28 thereon, the shoe and liner being of appropriate dimensions for braking engagement with the driving pulley 16. The brake engages the driving pulley, as depicted in Fig. 1, at a portion on the pulley that is otherwise unused, i.e., at a portion between extending portions of the belt 18. The brake shoe 26 is on an arm 30, and in the disclosed structure, is integral therewith, the arm being in the form of a lever pivoted at an end remote from the brake shoe 26 on means such as a pin 32 supported by a lug 33 on a bracket 34 which is mounted on the rear guard 12. The end of the arm 30 by which it is pivotally mounted, as herein illustrated, has a bifurcated portion 36 defining laterally spaced portions 38 between which the lug 33 is received. The portions 38 and lug 33 provide a symmetrical mounting for the brake means relative to the driving pulley 16, and the belt 18 passes through the space between the portions 38.

The arm 30 is biased away from the driving pulley 16, to an "off" position, by a tension spring 40 connected between the arm and a fixed portion of the machine. In the illustrated apparatus, the means for anchoring the spring includes a pin 42 mounted in the arm 38 and receiving one end of the spring, and a screw 44 extending through an aperture in a lug 46 which forms an extension of the bracket 34. Lock nuts 48 are threaded on the screw on opposite sides of the lug 46 for adjustably setting the position of the screw 44 and hence the tension of the spring 40. As viewed in Fig. 1, and from the foregoing description, it may be understood that the arm 30 is moved in counterclockwise direction (Fig. 1) to urge the brake liner 28 into frictional engagement with the pulley 16, and in the opposite direction for releasing the brake. The arm 30 is manipulated manually by a brake lever indicated in its entirety at 50 and mounted to project forwardly at the front of the lathe to enable an operator of the lathe to quickly and effectively depress it. The lever 50 is pivoted intermediate its ends on suitable means such as a pivot pin 52 supported by a bracket 54 which in turn is supported by the front guard 14. The lever includes, in addition to an outer handle portion 56 at the front of the lathe and at a convenient location for the operator to reach it and press downwardly on it by the brake, an inner end 58 operatively connected to the swinging end of the arm 30 for moving the latter in response to swinging movements of the brake lever. The connection between the brake lever and the arm 30 includes links 60 and 62, the link 60 being a compensating link pivoted at one end to the inner end of the brake lever 50 and at the other end to the link 62, the opposite end of the latter link being pivoted in the swinging end of the arm 30 at a position adjacent to, but spaced from, the extreme swinging end of the latter. The link 62 may also be referred to as an adjusting arm, having means thereon which cooperates with the arm 30 for adjusting the latter, and hence adjusting the brake shoe 26 and liner 28 relative to the brake lever 50. The link or adjusting arm 62 is provided with an adjusting screw 64 threaded in a solid or block portion 66 thereof. The screw, as depicted, is threaded through the block portion 66 and engages a surface 67 on the arm 30 for determining the relative positions of the adjusting arm 62 and the arm 30. A lock nut 68 is threaded on the adjusting screw 64 for locking the latter in its set position.

In manual actuation of the brake lever 50 for stopping the lathe, downward pressure is exerted by the operator on the handle portion 56. In response to resultant movement, the arm 30 carrying the brake means 26, 28, is swung upwardly, as viewed in Fig. 1. Upon release of the force moving the brake lever 50, the arm 30 is moved to a lower or inoperative position by the force of tension spring 40, and this movement also swings the brake lever 50 to a normal position in which the handle portion 56 is raised.

Mounted on the lathe are switches 70 and 72, the former being a safety switch adapted to actuation by brake lever 50, and the latter being a push button motor starting switch. The safety switch 70 is a normally open microswitch mounted on the front guard 14 for actuation between normal and actuated positions. The means for mounting the switch 70 may be of any preferred form such as a flexible strip 74 secured at one end to the switch and at the other end to the guard 14. The safety switch 70 is shown in Fig. 1 in a position in which it is engaged by the brake lever 50. When thus engaged with the handle portion 56 in its upper or normal position, the switch 70 is retained in its actuated or closed position. When the handle portion 56 is depressed, for stopping the lathe, the switch 70 is no longer engaged by the handle portion and moves to its normal or open position. Conductors 76 and 78 lead from the switch 70 and are connected in the circuit of Fig. 3, as will be explained more fully.

The switch 72 is a push button switch for starting the motor 22. In the disclosed apparatus, it is mounted in a housing 80 which encloses the main portion of the switch, while button 82 is mounted exteriorly of the housing for actuation of the switch. The housing 80 also encloses the switch 70. The switch 72 has conductors 84 and 86 which are connected as shown in the circuit of Fig. 3.

The circuit of Fig. 3 includes suitable power supply line leads 88 from which conductors 90 and 92 are connected to a main line switch 94. One of the conductors, such as 92, has a coil 96 connected in series therewith, which coil is part of a relay indicated generally at 98, and is connected to the conductor 84 of the push button switch 72 previously referred to herein; from the opposite side of which push button switch the conductor 86, also referred to herein, provides a connection to the conductor 90.

Included in the relay 98 is a switch 100 through which the conductor 76 is connected to the switch 70, previously referred to. The other conductor 78 leading from the opposite side of the switch 70 is connected to the conductor 84 and thus a circuit is completed through the latter conductor and coil 96 and through conductor 92 to the power source.

The motor 22 is connected in the circuit by conductors 102 and 104 through a suitable motor switch 106 of the double pole type. The conductor 102 has a switch 108 connected in series therewith and is connected to the conductor 90. The other conductor 104 is connected with the conductor 92. The switch 108, which is in series with the conductor 102, is included in the relay 98 and is actuated by the coil 96.

The circuit illustrated in Fig. 3 is utilized in instances in which the motor is connected directly to the driving pulley 16, in which instances, when it is desired to stop the lathe, the motor is shut off and the brake is applied. When starting the lathe, the brake lever 50 is normally released and in its upper position, in which position it maintains the safety switch 70 in the closed position. The safety switch 70 is shown in such closed position in Fig. 3. To start the lathe, the operator presses the push button 82 to actuate the switch 72, and this closes the circuit from conductor 92 through coil 96, conductor 84, switch 72, conductor 86 and conductor 90, the main switch 94 having been previously closed, as will, of course, be understood. The energization of the coil 96 thus closes the switches 100 and 108 to complete the power circuit to the motor. The switch 100 closes a circuit through the safety switch 70 which provides a holding circuit for the coil 96 from the power supply line. Such holding circuit is established through conductor 90, switch 100, conductor 76, switch 70, conductor 78, conductor 84, coil 96 and conductor 92. After the relay 98 is thus actuated to start the lathe, the operator may release the push button switch 72 and the holding circuit retains the relay 98 energized.

Upon such energization of the relay 98, the switch 108 is also closed and the circuit is then completed from the power supply to the driving motor 22 as follows: conductor 90, switch 108, conductor 102, the motor 22, conductor 104, and conductor 92. It will be understood, of course, that motor switch 106 will have been closed in the normal routine of operating the lathe. Thus the lathe will continue to operate until shut off.

Assuming that an emergency occurs and the operator desires to quickly stop the lathe: He impulsively presses down on handle 56. This action or movement of the handle 56 produces two distinct operations, namely, it shuts off the motor and applies the brake. Referring first to shutting off the motor, the lowering movement of the handle results in the opening of the safety switch 70. Referring to the circuit of Fig. 3, switch 70 is thus opened, and switch 72 has been in open position after completing the initial starting operation, as explained, and the coil 96 is de-energized so that switches 100 and 108 move to their open positions, the switch 108 particularly being effective in opening the circuit to the motor. Even if the operator should momentarily release the handle 56 and enable it to raise, such action will not have any effect in re-starting the motor. The switch 72 will remain open and if the switch 70 should again be closed, it will not be effective in closing the circuit.

The second phase of the stopping operation, namely, the application of the brake to the driving pulley 16, takes place as effectively as opening the circuit to the motor, as a result of the action of the operator in pressing down the handle 56 and applying force thereto. This movement of the handle, as will be understood from Fig. 1, rotates the brake lever 50 so that its inner end portion 58 moves upwardly, thereby moving the swinging end of the arm 30 upwardly toward the driving pulley. The greater the pressure applied on the handle 56, the greater will be the pressure applied on the brake engaging the driving pulley. Therefore, with the driving motor shut off, and force applied to the brake, the lathe will be rapidly brought to a stop.

The circuit of Fig. 4 is similar to that of Fig. 3, except that the circuit of Fig. 4 is for use with a constantly running motor and a clutch for controlling the transmission of the driving force from the motor to the driving pulley 16. In Fig. 4, the motor 22 is provided with an electrically operated clutch 110 of conventional nature understood to those skilled in the art, and may be of the type that is normally declutched, and actuated to clutched position in response to closing the circuit thereto. In the present instance, the conductors 90 and 92 are connected to conductors 112 and 114, respectively, which latter conductors are connected to the motor for supplying power thereto with relatively infrequent interruptions. Conductors 116 and 118 are connected to the clutch 110 and with the remaining circuit in the same manner as described in connection with the conductors 102 and 104 in Fig. 3. In the present case, in the control operations of the lathe, the clutch 110 is clutched or declutched instead of the motor being energized or deenergized, and the remaining functions are the same as those described in connection with the circuit of Fig. 3.

The action in stopping the lathe is extremely rapid and is particularly effective in the cases of an emergency, and more especially when bodily injury is imminent. The lathe must be manually restarted after having been stopped by the control apparatus disclosed herein. The handle 56 is positioned adjacent the operator's station and in such position that the operator will impulsively reach and press downwardly on it, as a natural reaction in the case of danger. The greater the reaction to the danger and consequent greater force applied to the handle, the greater will be the force applied on the brake.

I claim:

1. In a lathe having a rotatable means for rotating a workpiece and motorized means for driving the same, control means for quickly stopping the workpiece and the driving of the rotatable means in emergency or normal operating conditions and for preventing undesired re-starting thereof, comprising brake means for stopping the rotatable means, brake operating means including a handle adapted to be engaged by the lathe operator for movement to a first position in which said rotatable means is free to rotate and a second position in which the brake means are applied and said rotatable means is stopped, electric circuit means for connecting the motorized means with a source of electrical energy including a first starting circuit having a normally open starting switch and a relay coil controlled thereby, a second circuit including said motorized means and first switch means operatively controlled by said coil, and a third holding circuit independent of said first and second circuits and including said coil, second switch means controlled by said coil and a safety switch operated by said handle and adapted to be closed by movement of said handle to its said first position and opened by movement of said handle to its said second position; energization of said holding circuit permitting subsequent return of said starting switch to its normally open position without de-energizing said coil whereby operating control of said coil is thereupon shifted to said safety switch and said second circuit is thereby conditioned to be de-energized upon movement of said handle to open said safety switch and cause said brake means to stop said rotatable means.

2. In a lathe, rotatable means for rotating a workpiece, a motor for driving such rotatable means, and control means for quickly stopping the workpiece and the driving of the rotatable means in emergency or normal operating conditions and for preventing undesired re-starting thereof, said control means comprising brake means for stopping the rotatable means, brake operating means including a handle adapted to be manually engaged by the lathe operator for movement to a first position in which said rotatable means is free to rotate and a second position in which said rotatable means is stopped, electric circuit means for connecting the motorized means with a source of electrical energy including a first starting circuit having a normally open starting switch and a relay coil controlled thereby, a second circuit including said motorized means and first switch means operatively controlled by said coil, and a third holding circuit independent of said first and second circuits and including said coil, second switch means controlled by said coil and a safety switch adapted to be closed by movement of said handle to its said first position and opened by movement of said handle to its said second position; energization of said holding circuit permitting subsequent return of said starting switch to its normally open position without de-energizing said coil whereby operating control of said coil is thereupon shifted to said safety switch and said second circuit is thereby conditioned to be de-energized upon movement of said handle to open said safety switch and cause said brake means to stop said rotatable means.

3. In a lathe, rotatable means for rotating a workpiece, a motor for driving such rotatable means, and control means for quickly stopping the workpiece and the driving of the rotatable means in emergency or normal operating conditions and for preventing undesired re-starting of the lathe, said control means comprising a brake for arresting the rotatable means, brake operating means including a handle mounted for convenient manual engagement by the lathe operator for movement between a first position in which said rotatable means is free to rotate and a second position in which said rotatable means is stopped, means normally biasing said handle to its said first position, electric circuit means connecting the motor with a source of electrical energy, a first starting circuit having a normally open starting switch and a relay coil controlled thereby, electrically operated clutch means coupling the motor and the rotatable means, a second circuit including said clutch means and first switch means operatively controlled by said coil, and a third holding circuit independent of said first and second circuits and including said coil, a safety switch closed by movement of said handle to its said second position and second switch means responsively controlled by said coil; energization of said holding circuit energizing said coil through said safety switch and second switch means and thereby permitting return of said starting switch to its normally open position for de-energization of said starting circuit whereupon the operative disconnection of said clutch means is directly responsive to the opening of said safety switch at movement of said handle to arrest said rotatable means.

References Cited in the file of this patent

UNITED STATES PATENTS

| | | |
|---|---|---|
| 1,322,536 | Carr | Nov. 25, 1919 |
| 1,339,817 | Forsberg | May 11, 1920 |
| 1,579,455 | Remde | Apr. 6, 1926 |
| 2,339,030 | Purkett | Jan. 11, 1944 |
| 2,498,314 | Tholl | Feb. 21, 1950 |

FOREIGN PATENTS

| | | |
|---|---|---|
| 185,243 | Germany | Apr. 10, 1956 |